(12) United States Patent
Hironaka

(10) Patent No.: US 8,935,433 B1
(45) Date of Patent: Jan. 13, 2015

(54) CONNECTION OF MORE THAN THREE PLAYBACK DEVICES TO HDMI CEC LINK

(71) Applicant: Sony Corporation, Tokyo (JP)

(72) Inventor: Takashi Hironaka, San Diego, CA (US)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 14/053,971

(22) Filed: Oct. 15, 2013

(51) Int. Cl.
  *G06F 3/00* (2006.01)
  *G06F 13/12* (2006.01)
  *G06F 13/38* (2006.01)

(52) U.S. Cl.
  CPC .................................... *G06F 13/385* (2013.01)
  USPC ............. 710/3; 710/8; 710/9; 710/10; 710/62

(58) Field of Classification Search
  None
  See application file for complete search history.

(56) References Cited

U.S. PATENT DOCUMENTS

| 7,822,879 B2 | 10/2010 | Lida et al. |
| 8,255,579 B2 | 8/2012 | Kikkawa et al. |
| 2009/0296731 A1 * | 12/2009 | Lida et al. ................... 370/449 |

* cited by examiner

*Primary Examiner* — Idriss N Alrobaye
*Assistant Examiner* — David Martinez
(74) *Attorney, Agent, or Firm* — Miller Patent Services; Jerry A. Miller

(57) ABSTRACT

A method of operating HDMI ports. An HDMI port controller assigns virtual addresses when the maximum number of HDMI CEC addresses is exceeded and CEC logical addresses are duplicated with only one HDMI port corresponding to device having a CEC logical address having its port enabled at any given time. This abstract is not to be considered limiting, since other embodiments may deviate from the features described in this abstract.

30 Claims, 13 Drawing Sheets

US 8,935,433 B1

CONNECTION OF MORE THAN THREE PLAYBACK DEVICES TO HDMI CEC LINK

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

HDMI (High Definition Multimedia Interface) has become a popular standard for connection of audio-video devices to a television set and the like. Due to this popularity, more and more devices are being connected to a television set (TV) using HDMI cables. If these devices support HDMI CEC (Consumer Electronic Control) capability, these devices can be controlled using CEC commands.

In order to work as a HDMI CEC device, the device is assigned a logical address. However, in accord with the current industry standards, only three player devices, three recording devices, one audio system, and one TV can be assigned. While normally one TV and one audio system is usually sufficient, the limitation of only three player assignments may not always be enough.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

Figure 1:
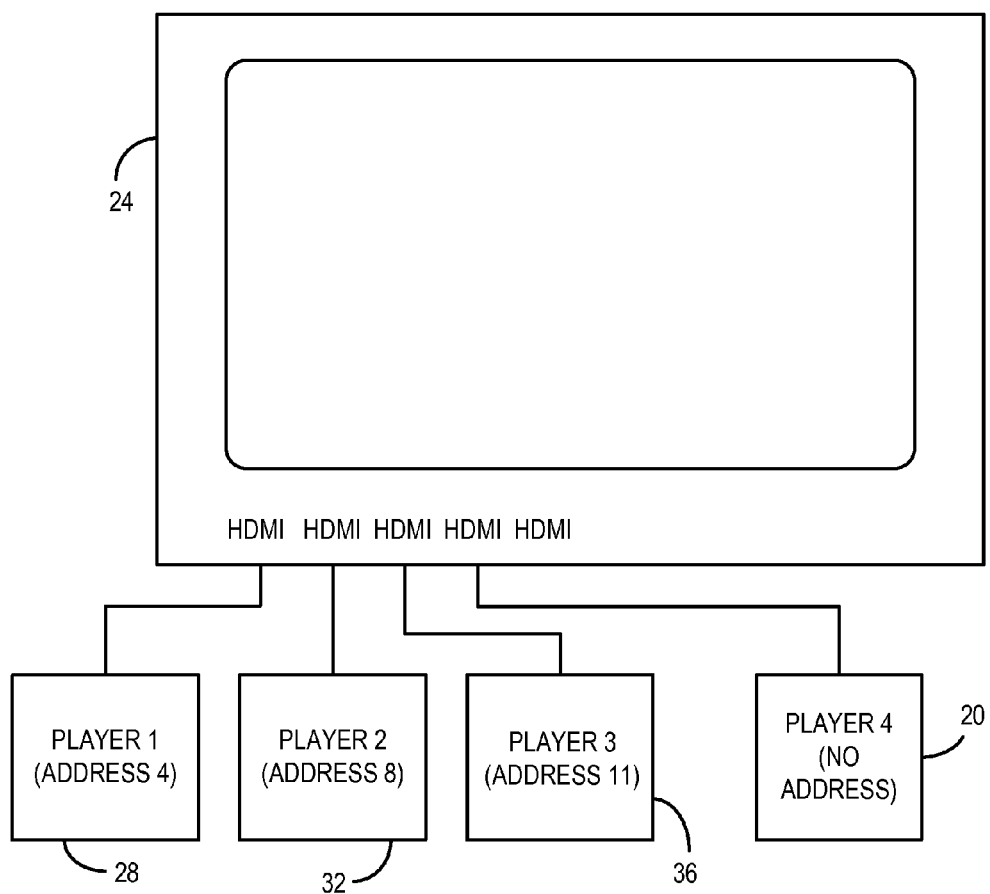
FIG. 1 is an example block diagram of a television system connected to four player devices.

While this invention is susceptible of embodiment in many different forms, there is shown in the drawings and will be herein described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

Reference throughout this document to "one embodiment", "certain example embodiments", "examples", "an embodiment", "an example", "an implementation" or similar terms means that a particular feature, structure, or characteristic described in connection with the embodiment, example or implementation is included in at least one embodiment, example or implementation of the present invention. Thus, the appearances of such phrases or in various places throughout this specification are not necessarily all referring to the same embodiment, example or implementation. Furthermore, the particular features, structures, or characteristics may be combined in any suitable manner in one or more embodiments, examples or implementations without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language).

The term "coupled", as used herein, is defined as connected, although not necessarily directly, and not necessarily mechanically.

The term "program" or "computer program" or similar terms, as used herein, is defined as a sequence of instructions designed for execution on a computer system. A "program", or "computer program", may include a subroutine, a function, a procedure, an object method, an object implementation, in an executable application, an app, a widget, an applet, a servlet, a source code, an object code, a shared library/dynamic load library and/or other sequence of instructions designed for execution on a computer system. The term "processor", "controller", "CPU", "Computer" and the like as used herein encompasses both hard programmed, special purpose, general purpose and programmable devices and may encompass a plurality of such devices or a single device in either a distributed or centralized configuration without limitation.

The terms "player device" and "playback device" are used interchangeably herein.

As noted above, HDMI has become a popular standard for connection of audio-video devices to a television set and the like. Due to this popularity, more and more devices are being connected to a TV using HDMI cables. If these devices support HDMI CEC capability, these devices can be controlled using CEC commands. In order to work as a HDMI CEC device, the device is assigned a logical address. However, in accord with the current industry standards, only three player devices, three recording devices, one audio system, and one TV can be assigned logical addresses as shown in the TABLE below. While normally one TV and one audio system is usually sufficient, the limitation of only three player assignments may not always be enough.

For example, suppose a user has a BluRay® disk (BD) player, a game console, an internet media player, and a digital camera connected using HDMI, all of them are player devices but one of them would be kicked out from CEC connection since the specification defines only three player devices. In accord with embodiments consistent with the present teachings, a solution is provided to have more than three player or recording devices in HDMI CEC link.

The allocation of logical addresses is described in the HDMI CEC specification (section CEC 10.2.1). Sixteen logical addresses are provided for and the logical addresses are defined in this specification in accord with the following TABLE.

TABLE

| LOGICAL ADDRESS | DEVICE |
|---|---|
| 0 | TV |
| 1 | Recording Device 1 |
| 2 | Recording Device 2 |
| 3 | Tuner 1 |
| 4 | Playback Device 1 |
| 5 | Audio System |
| 6 | Tuner 2 |
| 7 | Tuner 3 |
| 8 | Playback Device 2 |
| 9 | Recording Device 3 |
| 10 | Tuner 4 |
| 11 | Playback Device 3 |
| 12 | Reserved |
| 13 | Reserved |
| 14 | Specific Use (Free Use) |
| 15 | Unregistered (as Initiator address) Broadcast (as Destination address) |

Note that although there is "Free Use" logical address in the CEC specification, the "Free Use" logical address is reserved for a TV which could not get the "TV" logical address. So this "Free Use" address is not available for use by a player or recording device which is unable to get a logical address. As used herein, the term "logical address" is used to reference the address that is assigned to a device as described in connection with the TABLE. The term "virtual address" is also used herein and is intended to refer to an addressing that is used to differentiate between two attached HDMI devices that have been assigned the same logical address.

Consider the example system depicted in FIG. 1. In this example, the specification defines that the device 20 (player device in this explanation) acquires its logical address from television 24. The acquisition process starts by attempting to acquire the logical address initially as Playback device logical address 4. However, this address is assigned to Player 1 (28). Since logical address 4 is already taken, the process checks logical address 8, but it is taken by Player 2 (32). Since logical address 8 is taken, the process checks logical address 11, but it is taken by Player 3 (36). Once all three player addresses have been taken by players 28, 32 and 36, there are no further addresses to be had, so the fourth player device (Player 4) in this example cannot acquire a logical address. Hence, a problem here is that the specification allocates only three player/recording devices and the fourth device will be kicked out from CEC link.

A similar scenario exists if, for example TV 24 is connected to the HDMI player devices 28, 32, 36 and 20 through an HDMI switch 40. The same basic process is utilized in accord with the HDMI CEC specification with a similar result of there being no available address for Player 4 (20). The main distinction here is that the HDMI switch 40 carries out the actions described rather than the TV 24 carrying out such actions. In essence, the HDMI switch 40 resides in the TV in the case illustrated in FIG. 1.

Figure 2:
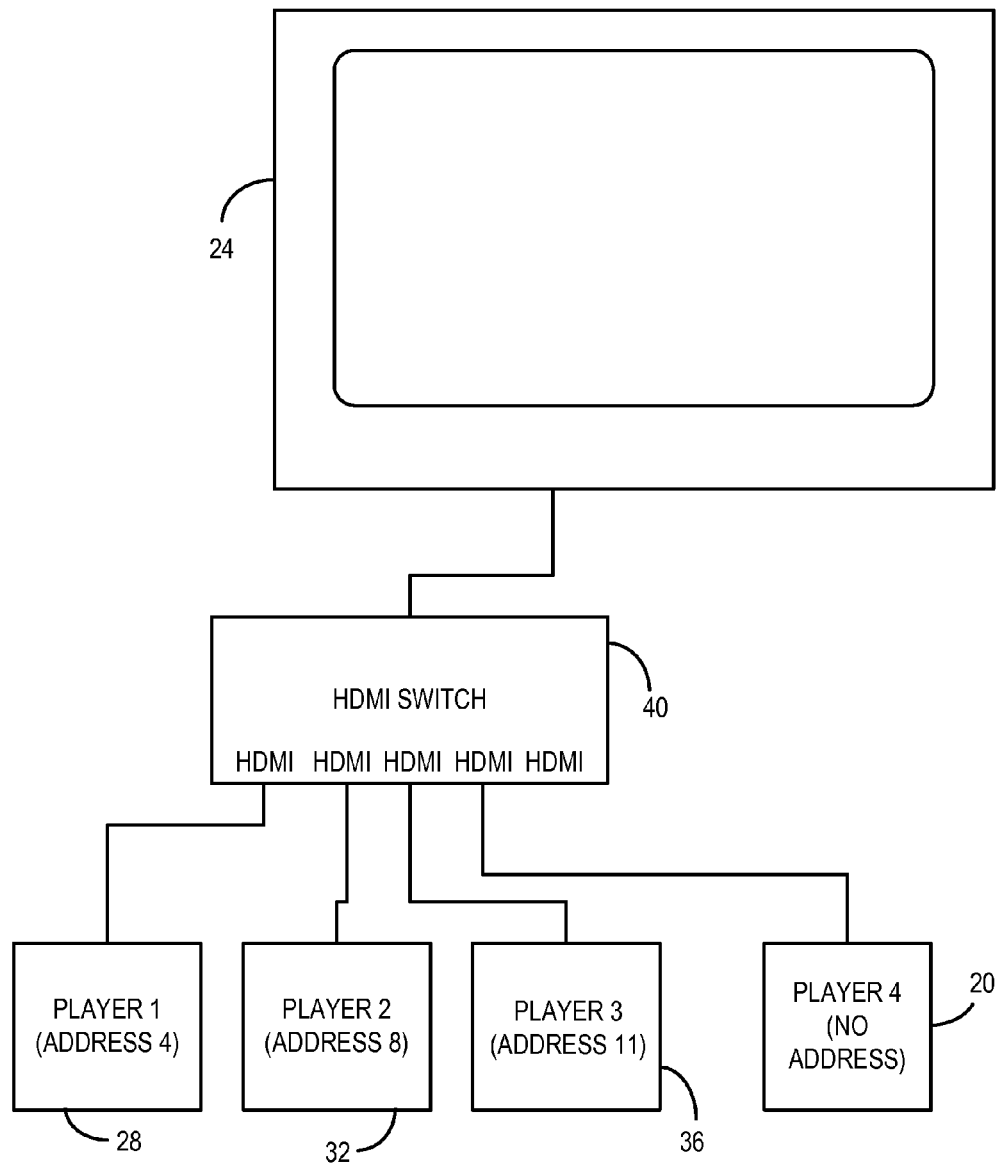
FIG. 2 is an example block diagram of a television system connected to four player devices via an HDMI switch.

Hence, as depicted in FIG. 1 and FIG. 2, the player or recorder devices are connected either to the TV 24's HDMI inputs directly (Usually the TV has multiple HDMI inputs), or via an HDMI switch such as HDMI switch 40. Case 1 below describes the case where the TV 24 has multiple HDMI inputs as illustrated in FIG. 1. Case 2 describes the case where for example a legacy TV is used and the method described herein is implemented using an HDMI switch 40 as depicted in FIG. 2.

Case 1

Figure 3:
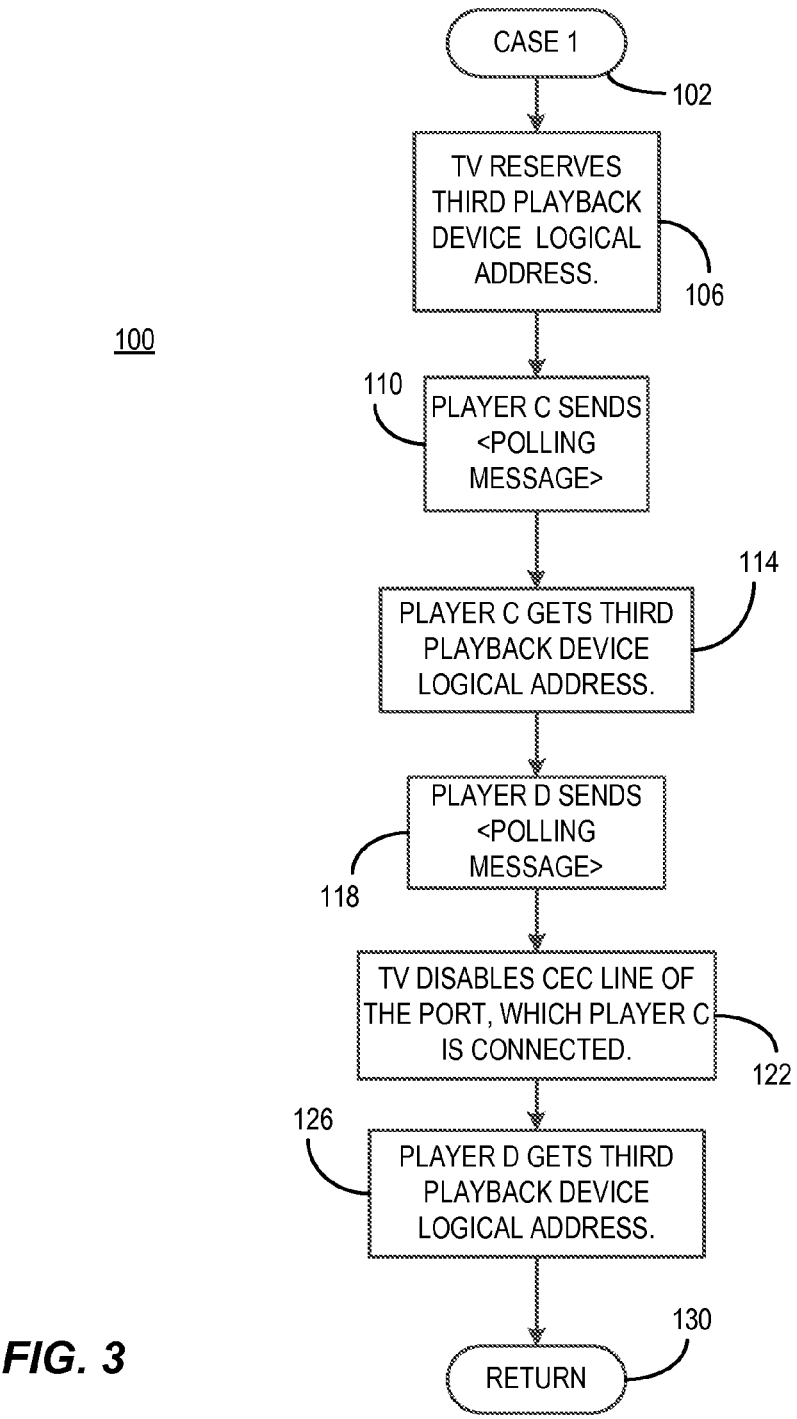
FIG. 3 is an example of a flow chart of a method consistent with certain example embodiments of the present invention.

In case 1, the TV's HDMI CEC logical address handles the logical address assignments and changes. For purposes of this example, assume the TV has four HDMI ports A, B, C and D and there are four player devices A, B, C and D using those ports as described below. The process is depicted, by way of example, in the process 100 of FIG. 3 starting at 102. The TV monitors the logical address acquisition process, and it is assumed at this point that first and second playback devices (playback device A and playback device B) have already acquired their logical addresses (ports A and B) in the manner provided for in the HDMI CEC specification. When the two player devices (Player A and player B) get logical addresses for ports A and B respectively, the TV reserves the third playback device logical address at 106.

When the third and higher device tries to get logical address, the TV reserves the address for the third playback device, but if the TV behaves as though the third playback device logical address is free, the third (Player C), the fourth (Player D), etc. . . . devices can get the reserved third playback device address.

A <Polling message> is used to determine if the logical address is already taken. For the third playback device, when the Player C checks if the third playback device logical address is free, this is done by player C sending the <Polling message> at 110 with the third playback device logical address. Since it is not yet taken, Player C is allowed to take the third address at 114. This transaction is monitored by the TV, so that the TV knows that Player C took the third player device logical address.

Now presume that a fourth player device Player D is connected. Recall that the TV is behaving as though the third logical address is available. The TV behaves as if the third player device logical address is free when Player D sends a <Polling message> requesting the third logical address at 118. The TV can do this by disabling the HDMI port C CEC line in the HDMI CEC driver at 122 (e.g., using a hardware switch or by blocking signals using logic or software control). Since the HDMI port C CEC line is disabled at 122, the player C does not receive the <Polling message> from Player D. Therefore, the Player D is also assigned the third player device logical address (playback device 3 in the TABLE) at 126 and the process returns at 130. So when more than one device uses the same CEC logical address, the CEC line can be disabled for the ports that are not currently assuming the role of a device with that specific logical address.

Now, the TV associates the Player C to HDMI port (Port C), which is the port to which Player C is connected. Additionally, the TV virtually assigns the third playback device logical address and associates the Player D to the HDMI port (Port D), which the Player D is connected to, and assigns a fourth playback device logical address virtually (inside the TV). In the present discussion, although two examples are depicted in FIG. 1 and FIG. 2, the same process is used, so while the discussion may use a TV as an example, it will be appreciated that the same process can be carried out in an HDMI switch. Similarly, although the likely primary use is for more than three Player devices, a similar process can equally well be implemented to accommodate more than three Recorder devices. Hence, the present teachings can be extended beyond player devices to recorder devices without limitation.

For ease of understanding, the various possibilities of messages being communicated are depicted in the several example flow charts as discussed below which are broken into the various types of communications and destinations, but which collectively depict the actions taken in the present example implementation. In these example cases, it is presumed unless stated otherwise that the three CEC logical addresses are occupied by Players A, B and C which are connected to ports A, B and C respectively. Player device D is connected to port D and shares the CEC logical address with Player C, with Players C and D having virtual addresses assigned.

Case 1-1—Outgoing Message from TV to Player Device
Case 1-1-1

When a command is directly addressed to Player C from the TV, the third playback device logical address is used and sent to the HDMI port C.

Case 1-1-2

When a command is directly addressed to Player D from the TV, the third playback device logical address is also used, but the command is sent to HDMI port D.

Figure 4:
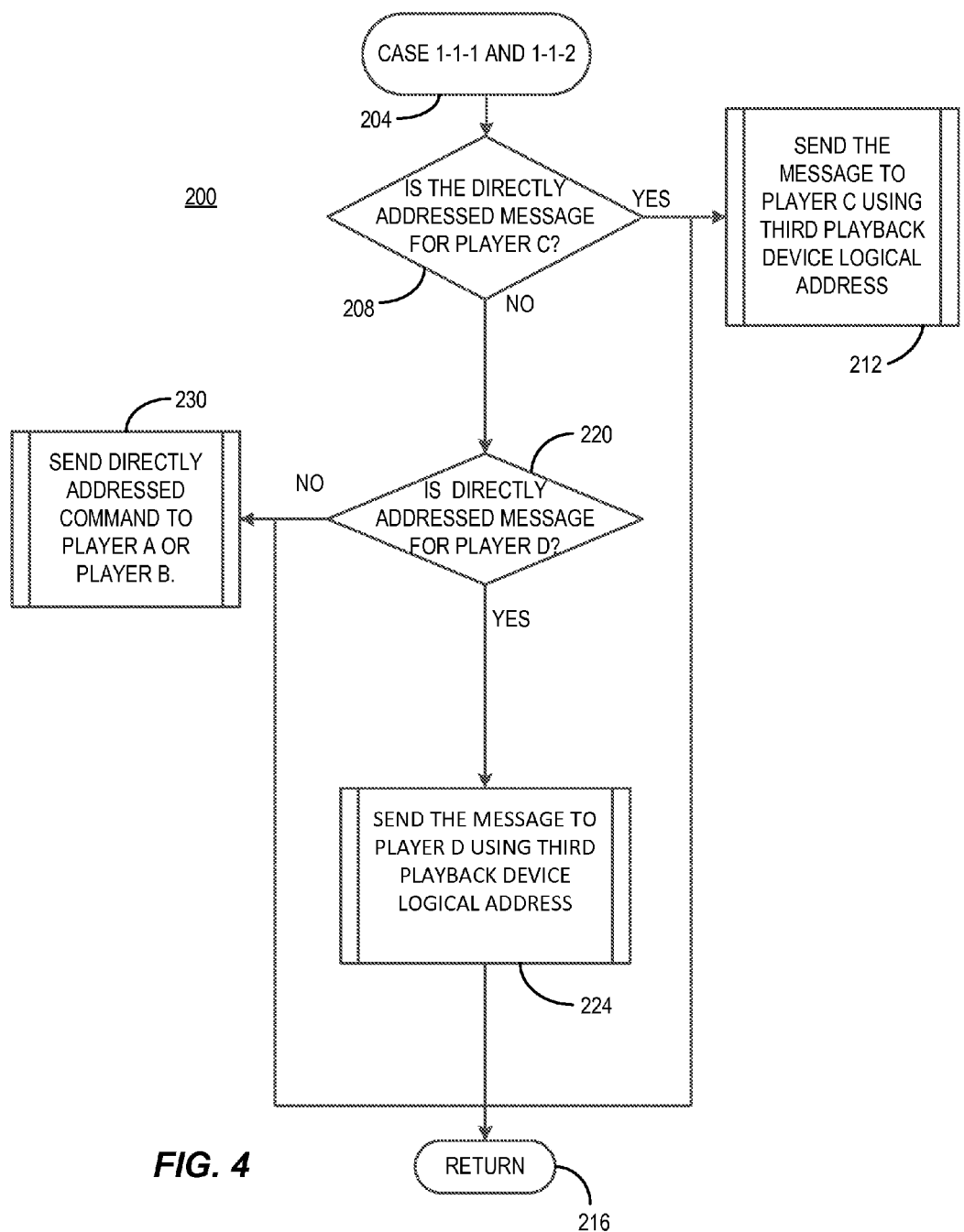
FIG. 4 is an example of a flow chart of a portion of a method consistent with certain example embodiments of the present invention.

Cases 1-1-1 and 1-1-2 are depicted in FIG. 4 as process 200 starting at 204. At 208, the process determines if there is a directly addressed message from the TV to Player C (via Player C's virtual address). If so, the process knows via the virtual address for Player C that Player C is connected to HDMI port C. Hence, the TV or HDMI switch directs the message to port C addressed to the third logical address at 212 and the process returns at 216. If a directly addressed message from the TV is not addressed to Player C's virtual address at 208, the process proceeds to 220. At 220, the process determines if a message from the TV is directly addressed to Player device D's virtual address. If so, the message is directed within the TV to Player D at the third playback device logical address via HDMI port D at 224 and the process returns at 216. If, however, at 220 the message is not directly addressed to Player D (and since at 208 it is also not directed to Player C), the message can be concluded to be addressed to Player A or Player B and at 230 the message is sent to either Player A or Player B via their logical address associated with HDMI ports A or B respectively and the process returns at 216.

Case 1-1-3

This is the case when a broadcast message is sent from the TV to all Player devices while one logical address is being shared by two or more Player devices.

Figure 5:
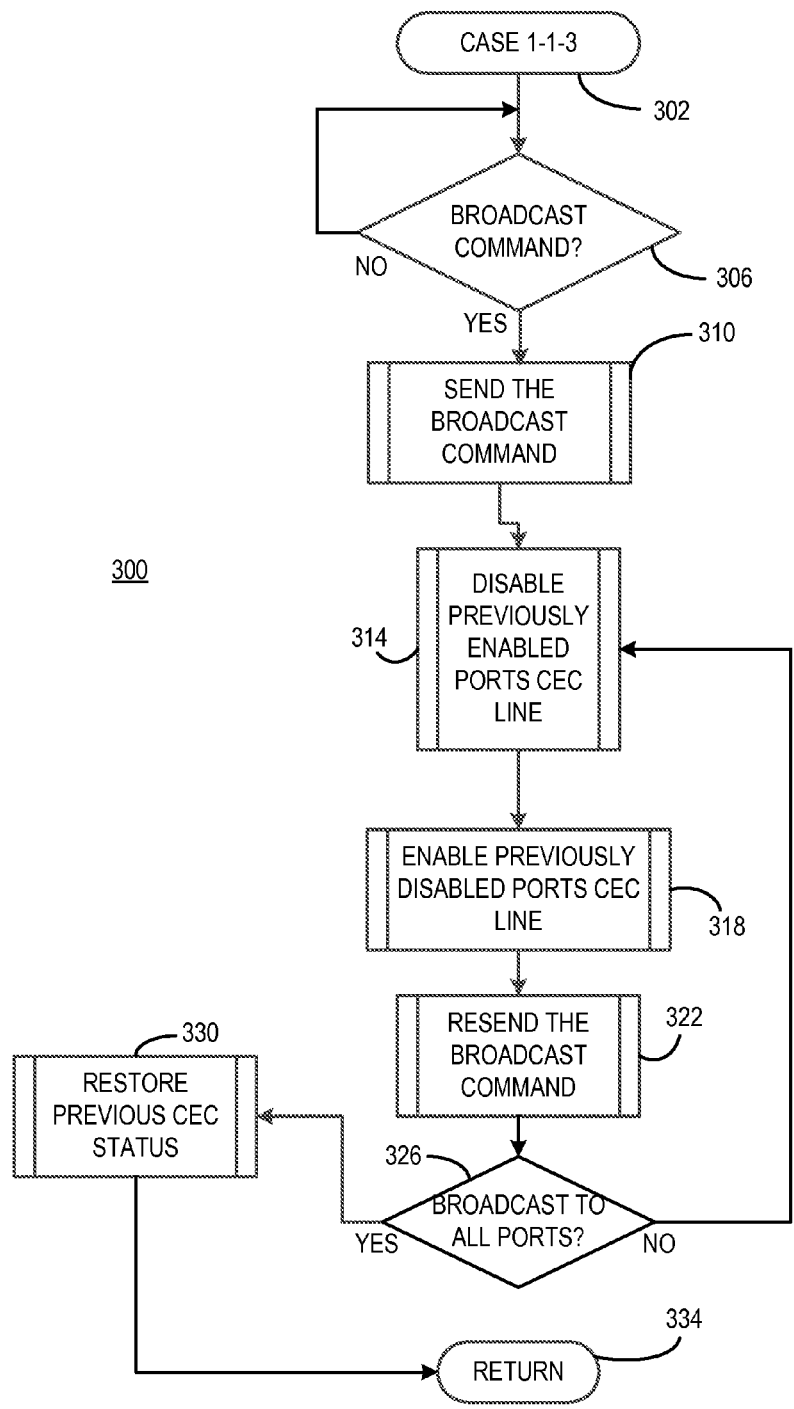
FIG. 5 is an example of a flow chart of a portion of a method consistent with certain example embodiments of the present invention.

This case is depicted as process 300 in FIG. 5, starting at 302 after which a determination is made that a broadcast command has been received at 306. When the broadcast command, which is intended for all the connected devices, is sent while the CEC for port C is enabled and the CEC for port D is disabled, for example. The TV sends this broadcast command at 310 which will be received by ports A, B and C.

The process then disables the ports A, B, and C which were previously enabled at 314 and enables port D which was previously disabled at 318. The same broadcast command is then sent to the port D which was previously disabled but is now enabled at 322. The process then determines if all ports have received the broadcast message at 326 and if so, restores the CEC status to enable the originally enabled ports and disable the originally disabled ports at 330. If not, the process repeats to assure that all ports are appropriately sent the broadcast command. The process returns at 334.

Cases 1-1-3 can also be handled in a manner not depicted in FIG. 5 by simply recognizing that the command is a broadcast command and sending the command to all devices connected to any port. Other variations may occur to those skilled in the art upon consideration of the present teachings.

Case 1-2—Incoming Message From Devices to the TV
Case 1-2-1 When the directly addressed command is sent from the device to the TV, TV needs to check HDMI port to translate its logical address from a CEC logical address to a virtual address. This can be done by checking HDMI port. If the direct message is sent from HDMI port A, B, or C, the TV does not have to translate logical address.

Case 1-2-2

When the directly addressed command is sent from the device to the TV, the TV checks the HDMI port to translate its logical address from a CEC logical address to a virtual address associated with the port. This can be done by checking HDMI port. If the direct message is sent from HDMI port D, the third playback device logical address is translated to the fourth virtual logical address.

Figure 6:
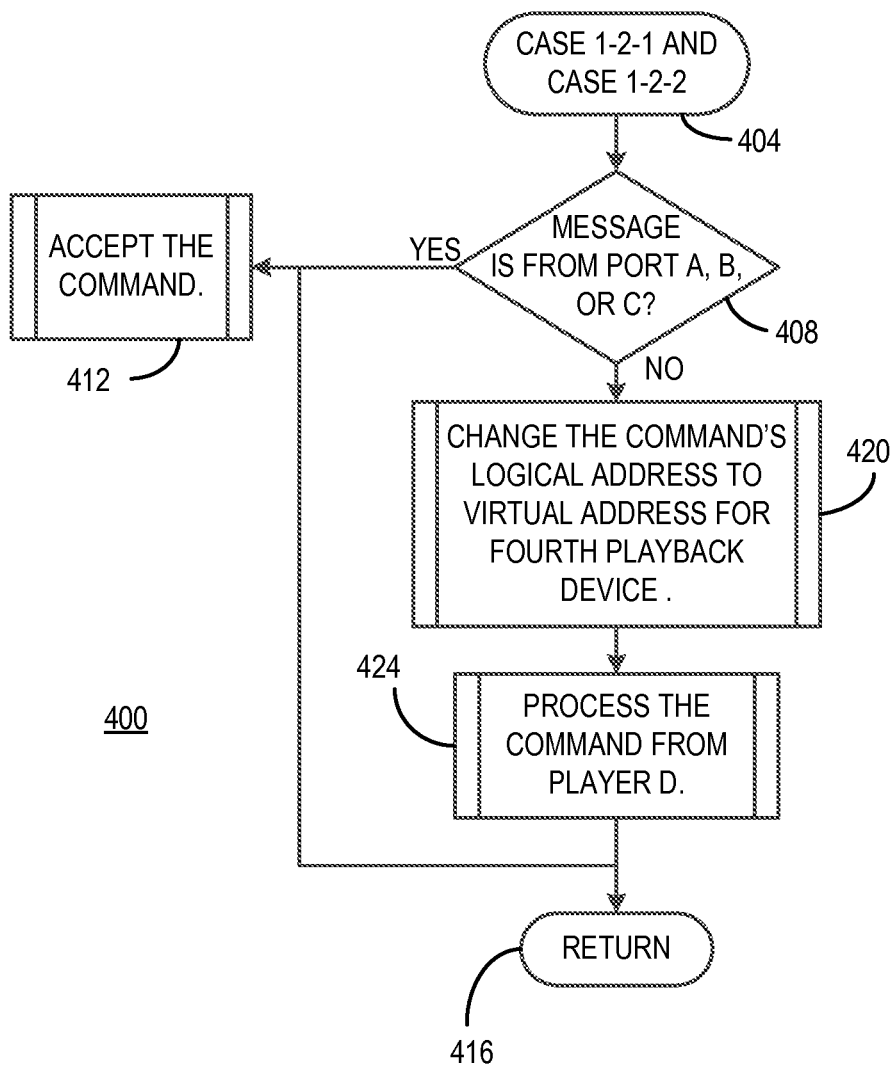
FIG. 6 is an example of a flow chart of a portion of a method consistent with certain example embodiments of the present invention.

Referring to FIG. 6, an example process 400 that implements cases 1-2-1 and 1-2-2 is depicted starting at 404. At 408 a determination is made as to whether the message is from ports A, B or C which corresponds in this example to the first, second and third Player devices connected respectively to those ports. If so, the command is accepted at 412 and the process returns at 416. If the message is not from port A, B or C at 408, the command's logical address is changed to the virtual address of the fourth playback device at 420. The command from device D is then processed at 424 and the process returns at 416.

Case 1-2-3

When a broadcast message is sent from the Player A, B, or C, the TV can simply accept the broadcast command and process it. For the case where Player D initiates the broadcast command, the TV changes initiator to the playback device having the first or second logical address, whichever but existing one, and forward to the player D.

Figure 7:
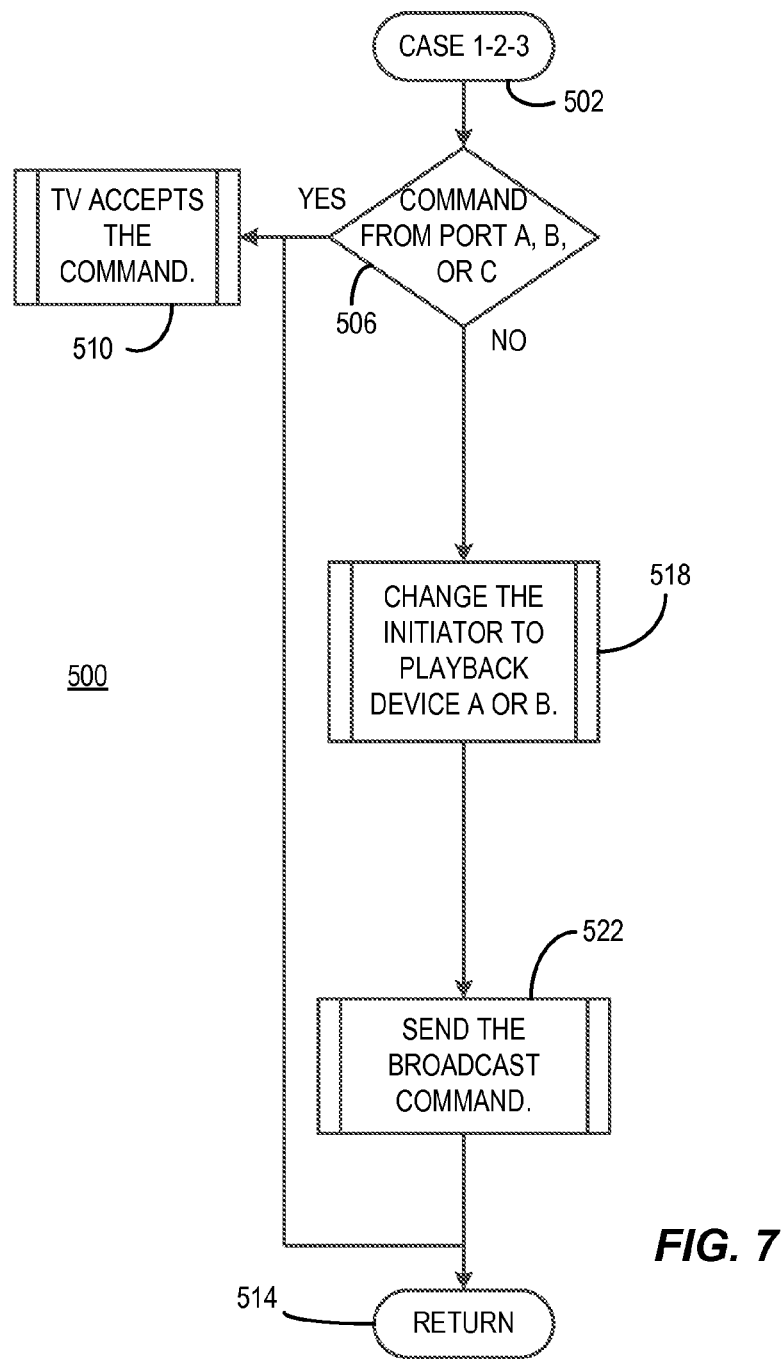
FIG. 7 is an example of a flow chart of a portion of a method consistent with certain example embodiments of the present invention.

This process is depicted as 500 at FIG. 7 starting at 502. If the command is from any of ports A, B or C at 506, the TV or HDMI switch accepts the command and operates normally at 510 and the process returns at 514. However, if the command was initiated by Player D (which shares address with Player C), the process changes the initiator information to Player A or B at 518 so as to permit Player C to not be confused by a message that purports to have originated from the address shared between Players C and D. The broadcast command is then sent at 522 and the process returns at 514.

Case 2

This case applies to a TV that does not have Case 1 capabilities (i.e., a legacy TV with only a small number of HDMI inputs). For this case, an HDMI Switch such as switch 40 is used to achieve this functionality.

In this case, the TV's software (or hardware) is may not be able to change to add the function of embodiments as described herein, so the HDMI CEC logical address solution as described herein is provided through the HDMI switch as a part of the HDMI CEC switching mechanism. This switch knows the playback device logical address of the TV, but the switch is seen by the TV as if it were a Player device. However, the HDMI switch has full switch functionalities described in the HDMI specification as well as the capabilities described herein. By having the logical address of the attached devices, the HDMI switch provides the virtual address assignment function as described above to connected Player devices. By doing this, more than three Player devices can be in HDMI CEC link. In this implementation, <Polling message> is limited to CEC devices connected to the switch and to the switch itself. The player device determines its logical address device from the polling message. The switch manipulates the polling message as if the third playback device is available when player D sends the polling message. Thus, the player device D and player device C both get the playback device 3 logical address, and via the mapping in the switch, player D is associated with the virtual logical address as a fourth playback device. Thus the HDMI switch associates the device with a virtual address in implementing example embodiments.

Since the TV, in this case, does not recognize more than three player devices, the TV selects this switch, instead of connected Player devices. When the TV selects the switch, which has a Player device HDMI CEC logical address, the switch, which recognizes an <Active Source> command from the TV, shows a list of connected devices. The switch has a capability to show the list of devices for display on the TV screen. TV then sends <User Control Pressed/Released> command to select the device shown on the list. When the device is selected, the switch does a routing change procedure as described in the HDMI CEC specification. The selected device becomes the active source and sends HDMI signals through the HDMI switch to the TV. There are several sub-cases described in detail as follows:

Case 2-1-1

When a command is directly addressed and sent from the device to the TV, the switch determines which device sent the command and which device should receive the command. If both devices C and D are connected to the switch and share a logical address, the switch changes initiator and destination address if necessary and forward the command.

Case 2-1-2

When a command is directly addressed and sent from a Player device to the TV, the switch determines which device sent the command and which device should receive the command. If the destination device is not connected to the switch, then the switch replaces the initiator logical address in the CEC command to the one that the switch is holding and the switch forwards the command.

Figure 8:
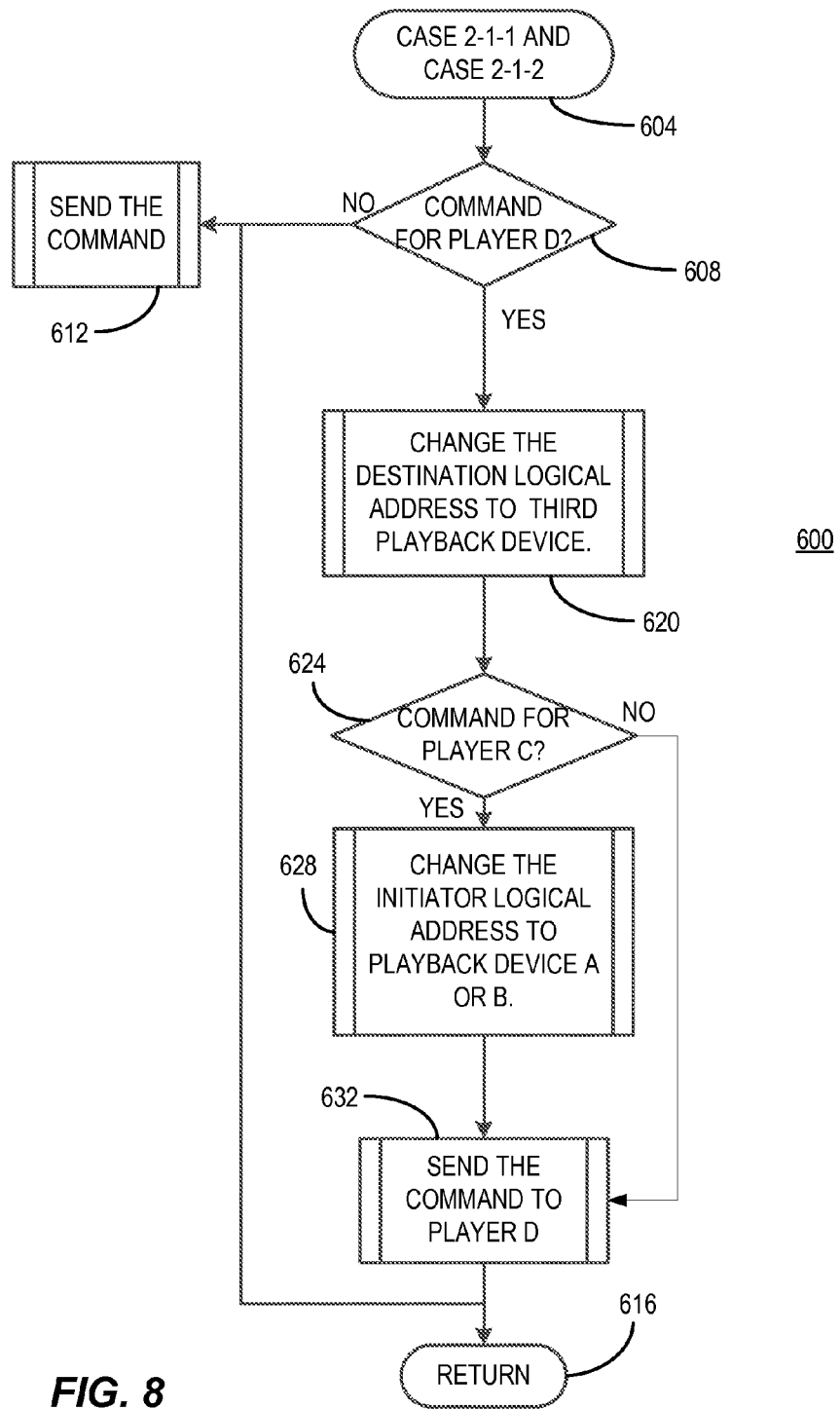
FIG. 8 is an example of a flow chart of a portion of a method consistent with certain example embodiments of the present invention.

The cases 2-1-1 and 2-1-2 are depicted in detail in FIG. 8 as process 600 starting at 604. This example again assumes that Players C and D share the same logical address and are assigned virtual addresses by the HDMI switch with only four player devices attached. At 608 the process determines if the command is for player D or not. If not, the command is sent at 612 and the process returns at 616. If so, at 608, the destination logical address is changed to the third logical address that is assigned to Players C and D (i.e., CEC address for Playback device 3) at 620. The process then proceeds to 624 where the process determines if the command is for player C and if so the initiator logical address is changed at 628 to either the logical address for Player A or Player B so as to spoof the address. The command is then sent at 632 and the process returns at 616. If the command is not for Player C at 624, then there is no reason to spoof an address and the command is sent to player D at 632 bypassing 628 and the process returns at 616.

Case 2-1-3

When the broadcast message is sent from the Player device and the message comes from outside of the switch, then the switch simply re-broadcast the message to the devices connected to the switch. When a broadcast message is sent from the Player device and the broadcast message comes one of the devices connected to the switch, the switch simply rebroadcasts the message to the device connected to the switch. For devices outside of the switch, the switch replaces the initiator logical address of the CEC command to the one that the switch is holding and sends the message outside of the switch.

Figure 9:
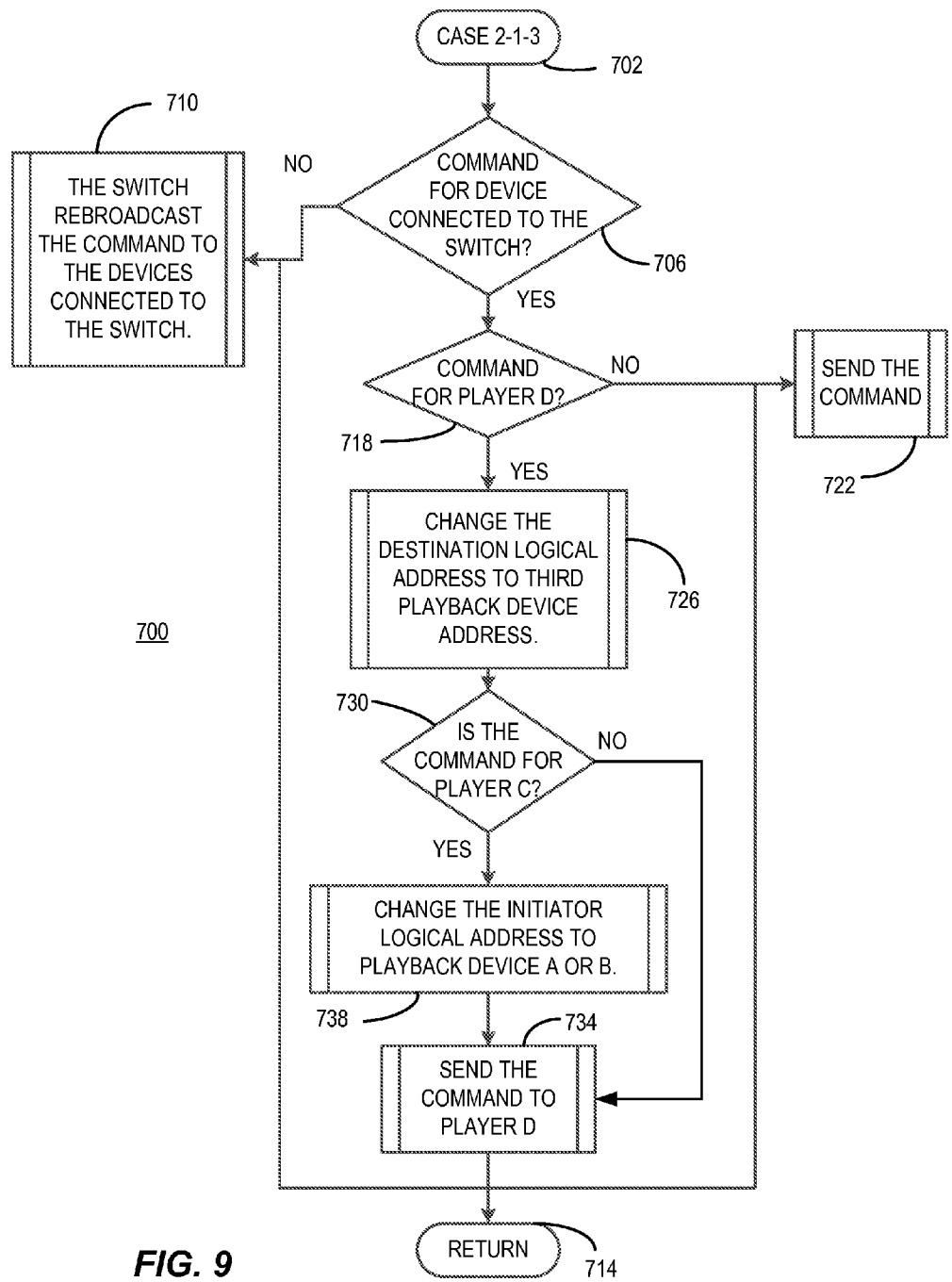
FIG. 9 is an example of a flow chart of a portion of a method consistent with certain example embodiments of the present invention.

This case 2-1-3 is depicted by way of example as process 700 of the flow chart depicted in FIG. 9 starting at 702. At 706, the process determines if the command is for a device connected to the switch and if not, the switch rebroadcasts the command to all of the devices connected to the switch at 710 and the process returns at 714. But, if the command is not for a device connected to the switch at 706, the process determines if the command is destined for player D at 718. If not, the command is sent at 722 and the process returns at 714. If the command is not for player D at 718, then control passes to 726 where the destination logical address is changed to the third playback device logical address and control passes to 730. If at 730 the command is not for player C, control passes to 734 where the command is sent to Player D and the process returns at 714. If the command is for Player C at 730, then the initiator logical address is changed to Player device A or B so as to spoof the origin of the command at 738. The command is then sent at 734 and the process ends at 714.

This HDMI switch solution implements the Case 1 solutions as well addressing the case where more than three playback devices are connected to the HDMI switch. This solution breaks the HDMI CEC limitations on the number of devices that can be connected. The CEC specification was defined at a time when it was hard to imagine more than three Playback devices being connected. The CEC initiator and destination fields only allocate 4 bits each, which limits number of logical addresses to 16. Two of the reserved logical addresses have still not been assigned to valid logical devices, even after several specification revisions as of this writing.

Figure 10:
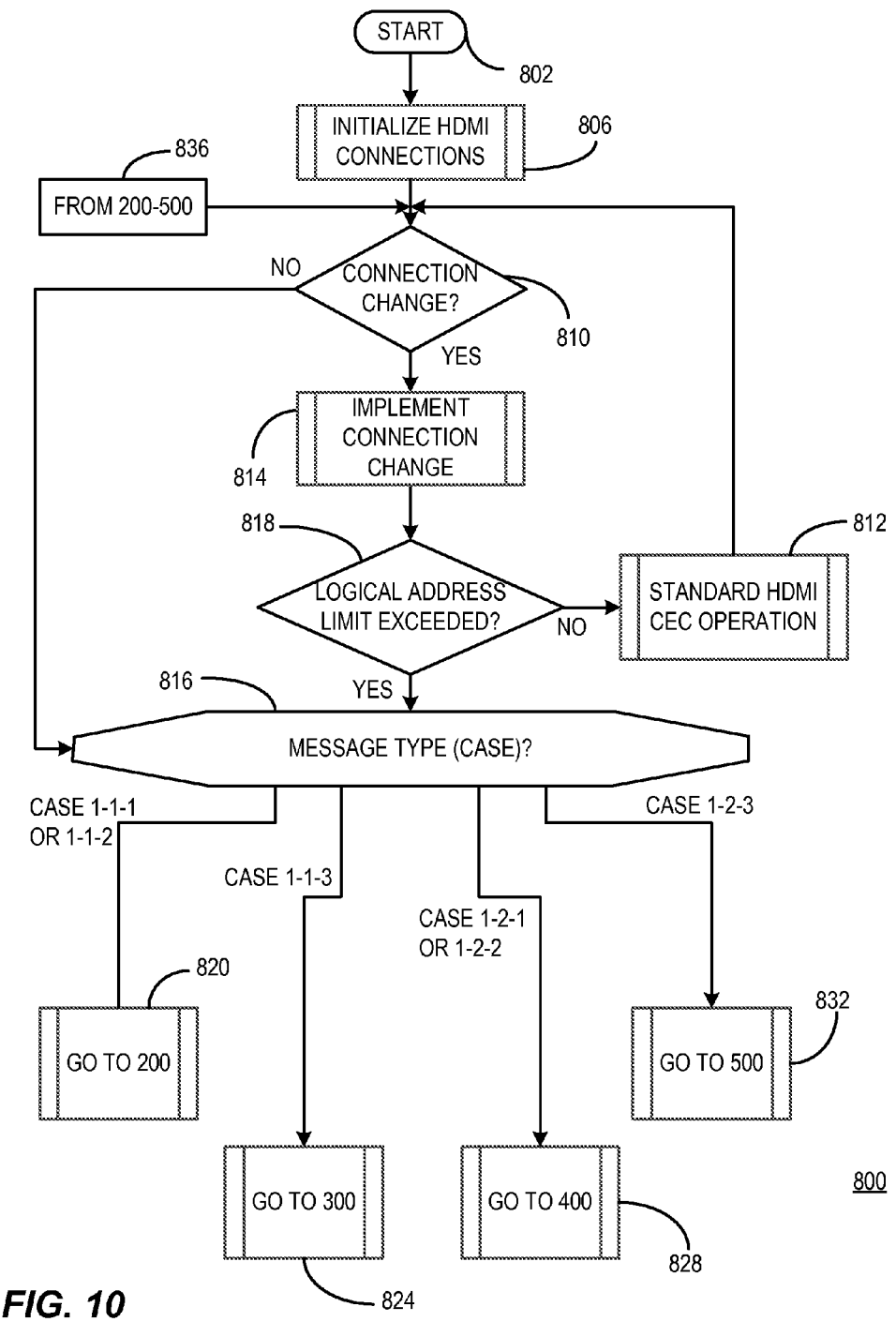
FIG. 10 is an example of an implementation of an overall process invoking the processes 200-500 in a manner consistent with certain example embodiments of the present invention.

Referring now to FIG. 10, depicting process 800 starting at 802 an overall process is provided that links the sub-processes 200-500 together in one implementation consistent with the present teachings. At 806 the HDMI enabled TV initializes all HDMI connections. When a connection change occurs at 810, these changes are implemented at 814 so that the TV can keep track of the various devices and addresses of devices connected. If at 818, the logical address limit imposed by the HDMI CEC specification has not been exceeded, the TV operates according to standard HDMI CEC specified operation at 812 until a connection change is detected at 810 that causes the logical address limit to be exceeded at 818.

When the logical address limit is exceeded, control passes to 816 where message types are analyzed and categorized into cases 1-1-1 or 1-1-2; or 1-1-3; or 1-1-2-1 or 1-2-2; or 1-2-3. If the message or command is of case type 1-1-1 or 1-1-2, control passes to 820 where the process goes to sub-process 200. If the message or command is of case type 1-1-3, control passes to 824 where the process goes to sub-process 300. If the message or command is of case type 1-2-1 or 1-2-2, control passes to 828 where the process goes to sub-process 400. If the message or command is of case type 1-2-3, control passes to 832 where the process goes to sub-process 500. When any of these processes return, they pass to 836 and the process 800 is re-entered at 810. Other variations will occur to those skilled in the art upon consideration of the present teachings.

Figure 11:
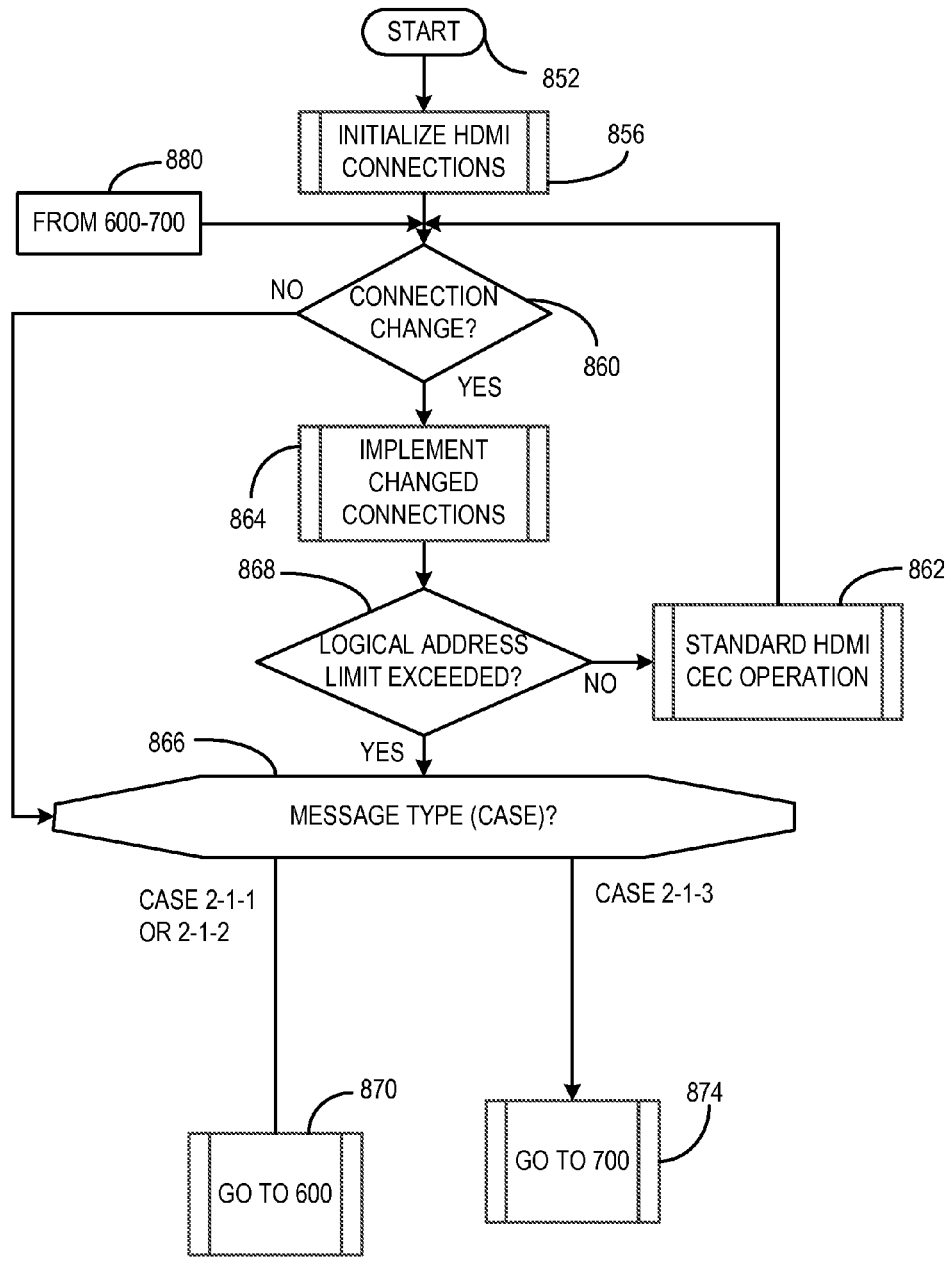
FIG. 11 is an example of an implementation of an overall process invoking the processes 600-700 in a manner consistent with certain example embodiments of the present invention.

A similar overall process is depicted in FIG. 11 as process 850 starting at 852 for the case of the HDMI switch. Referring now to FIG. 11, depicting process 850 starting at 852 an overall process is provided that links the sub-processes 600-700 together in one implementation consistent with the present teachings. At 856 the HDMI switch initializes all HDMI connections. When a connection change occurs at 860, these changes are implemented at 864 so that the HDMI switch can keep track of the various devices and addresses of devices connected. If at 868, the logical address limit imposed by the HDMI CEC specification has not been exceeded, the HDMI switch operates according to standard HDMI CEC specified operation at 862 until a connection change is detected at 860 that causes the logical address limit to be exceeded at 868.

When the logical address limit is exceeded at 868, control passes to 866 where message types are analyzed and categorized into cases 2-1-1 or 2-1-2; or 2-1-3. If the message or command is of case type 2-1-1 or 2-1-2, control passes to 870 where the process goes to sub-process 600. If the message or command is of case type 2-1-3, control passes to 874 where the process goes to sub-process 700. When any of these processes return, they pass to 880 and the process 850 is re-entered at 860. Other variations will occur to those skilled in the art upon consideration of the present teachings.

While the present discussion has largely assumed that one additional device is attached to an HDMI port when the maximum has been reached, the principle can be extended to several additional devices without limitation by providing for multiple virtual addresses to be assigned to one or more devices occupying the same logical address or addresses. Moreover, while depicted as a method of breaking the barrier of three HDMI Player devices, a virtually identical process can be used to permit more than three HDMI Recorder devices or more than four HDMI Tuners. Even more than one HDMI TV may be implemented, although similar processes may be used with a higher level of complexity. In the case of more than four tuners, the process described simply accounts for one additional connected device such that, for example, in FIG. 13 the logical addresses are assigned to the first four connected devices and the fourth and fifth devices share a logical address, and the fourth and fifth devices are assigned virtual addresses in the same manner described above. Such variations are contemplated by the present disclosure. Hence, the present process is generally applicable to providing more addresses for HDMI devices. Other variations will occur to those skilled in the art upon consideration of the present teachings.

Figure 12:
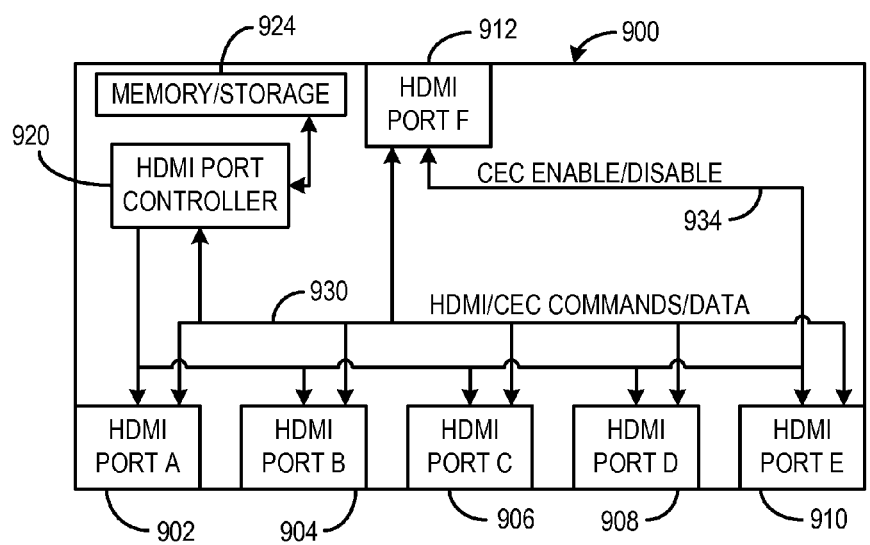
FIG. 12 is an example block diagram of a HDMI switch, which may be implemented as a standalone switch or part of another device such as a television set, that is consistent with certain example embodiments of the present invention.

Referring now to FIG. 12, an example HDMI switch 900 is depicted in block diagram form. Such switch may be a standalone HDMI switch or may be embedded in a consumer electronics device such as a TV without limitation. The HDMI switch 900 includes a plurality of HDMI ports (902, 904, 906, 908, 910 and 912) which as depicted each include an HDMI interface. While six such HDMI ports and associated HDMI interfaces are depicted, those skilled in the art will appreciate in light of the present teachings that any suitable number of such ports and interfaces can be provided without limitation from the present example. In this example, each of the HDMI ports 902-912 is controlled by HDMI port controller circuit 920 which may be in the form of a programmed processor storing control programs implementing the process described in memory/storage 924, or may operate as hard wired logic without limitation. The HDMI port controller 920 provides control, communication and data signal transfer among the various HDMI ports via HDMI/CEC connections 930. Additionally, HDMI port controller 920 provides control over enabling and disabling at least two or preferably all of the HDMI ports via CEC Enable/Disable signals depicted separately as 934. This can be implemented as individual interconnections or via addressed communications to each port or in any other manner desired. Switch 900 can be embodied as a standalone HDMI switch or as a part of a consumer electronics device such as a television set.

Whether a TV or an HDMI switch or other consumer electronics device embodies the present teachings, actions carried out in an HDMI port controller may be implemented in hard wired logic or as one or more a programmed processors operating as described herein. Other variations will occur to those skilled in the art upon consideration of the present teachings.

Figure 13:
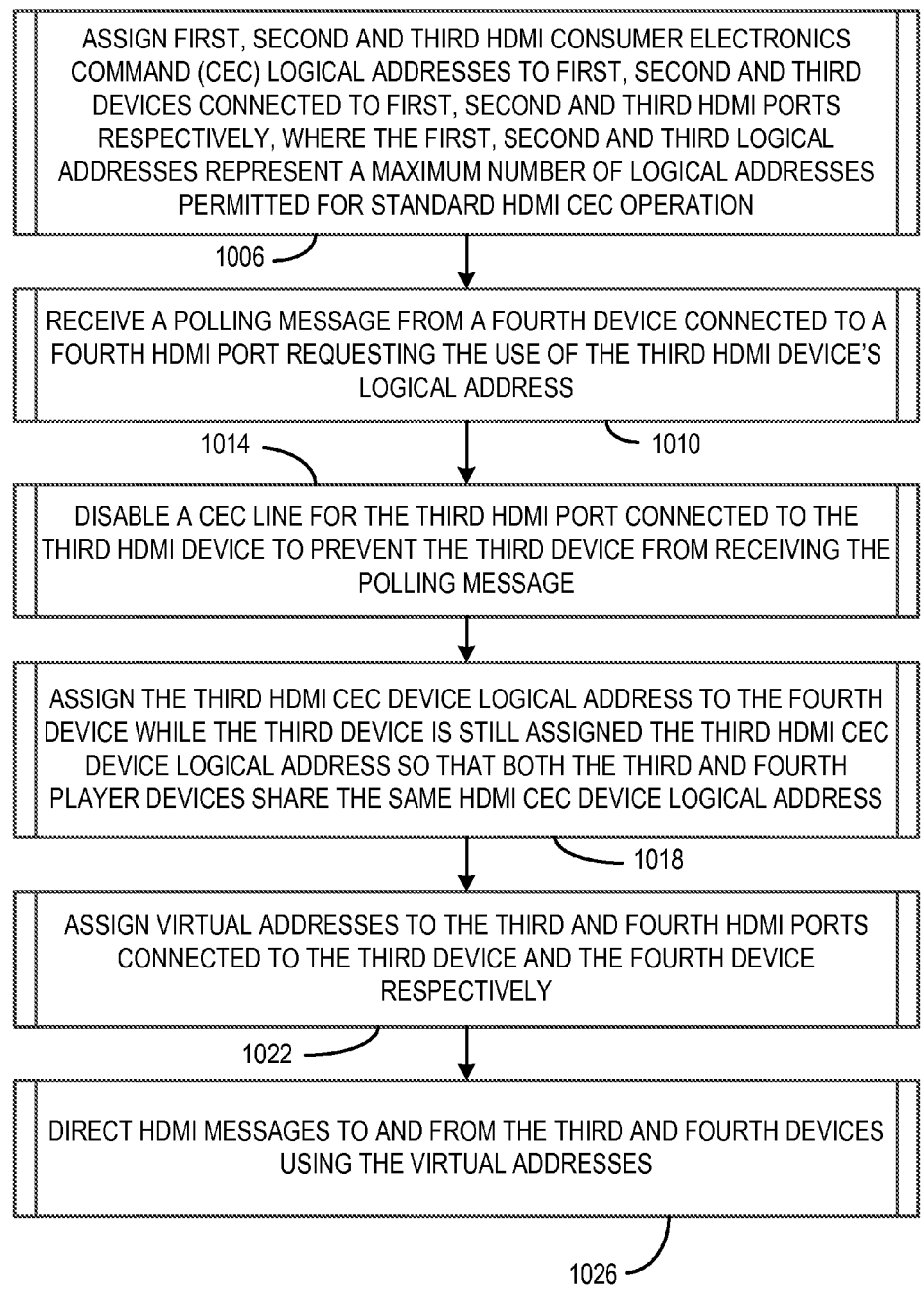
FIG. 13 is an example of a flow chart of operation of assigning addresses to a newly connected device that exceeds CEC logical addressing limits which may be implemented as a standalone switch or part of another device such as a television set, in a manner consistent with certain example embodiments of the present invention.

Referring now to FIG. 13, an example implementation of certain aspects consistent with the present teachings is depicted as flow chart 1000. At 1006, the port controller acts to assign first, second and third HDMI consumer electronics command (CEC) logical addresses to first, second and third devices connected to first, second and third HDMI ports respectively, where the first, second and third logical addresses represent a maximum number of logical addresses permitted for standard HDMI CEC operation. At 1010, the port controller acts to receive a polling message from a fourth device connected to a fourth HDMI port requesting the use of the third HDMI device's logical address. At 1014, the port controller acts to disable a CEC line for the third HDMI port connected to the third HDMI device to prevent the third device from receiving the polling message. At 1018, the port controller acts to assign the third HDMI CEC device logical address to the fourth device while the third device is still assigned the third HDMI CEC device logical address so that both the third and fourth player devices share the same HDMI CEC device logical address. At 1022, the port controller acts to assign virtual addresses to the third and fourth HDMI ports connected to the third device and the fourth device respectively. At 1026, the port controller acts to direct HDMI messages to and from the third and fourth devices using the virtual addresses.

Thus, a method of operating HDMI ports uses the HDMI port controller to assign virtual addresses when the maximum number of HDMI CEC addresses is exceeded and CEC logical addresses are duplicated with only one HDMI port corresponding to device having a CEC logical address having its port enabled at any given time.

An example method of operation of High Definition Multimedia Interface (HDMI) ports involves at an HDMI port controller: assigning first, second and third HDMI consumer electronics command (CEC) logical addresses to first, second and third devices connected to first, second and third HDMI ports respectively, where the first, second and third logical addresses represent a maximum number of logical addresses permitted for standard HDMI CEC operation; receiving a polling message from a fourth device connected to a fourth HDMI port requesting the use of the third HDMI device's logical address; disabling a CEC line for the third HDMI port connected to the third HDMI device to prevent the third device from receiving the polling message; assigning the third HDMI CEC device logical address to the fourth device while the third device is still assigned the third HDMI CEC device logical address so that both the third and fourth devices share the same HDMI CEC device logical address; assigning virtual addresses to the third and fourth HDMI ports connected to the third device and the fourth device respectively; and directing HDMI messages to and from the third and fourth devices using the virtual addresses.

In certain implementations, the directing is carried out by categorizing a type of message and processing the message in accord with the categorized message type. In certain implementations, when an HDMI message is directly addressed to the fourth device, and the directing involves: determining the virtual address of the fourth HDMI device; and directing the HDMI message to the HDMI port to which the fourth HDMI device is connected. In certain implementations, when an HDMI broadcast message is sent directed to multiple devices, and the directing involves sending the broadcast message to all devices having a CEC logical address and a CEC connection to an HDMI port; and sending the broadcast message a device having no CEC connection to an HDMI port but having a virtual address and having a CEC logical address assignment.

In certain implementations, sending the broadcast message to all devices having no CEC connection to an HDMI port involves: disabling a CEC connection to one of the devices connected to a CEC HDMI port; and enabling a CEC connection to the device having no CEC connection to an HDMI port; and re-sending the broadcast message to the device formerly having no CEC connection to the HDMI port. In certain implementations, when an HDMI message is sent from a device having no CEC connection to an HDMI port but having a virtual address and having a CEC logical address assignment, and where the directing involves changing the HDMI message's logical address to a virtual address; and processing the message. In certain implementations, when an HDMI broadcast message is sent from a device having no CEC connection to an HDMI port but having a virtual address and having a CEC logical address assignment, and where the directing involves changing the HDMI broadcast message's logical address to the logical address for a device having a CEC connection to an HDMI port but having no virtual address; and broadcasting the HDMI broadcast message.

In certain implementations, when an HDMI message is sent from an initiator device to a device having no CEC connection to an HDMI port but having a virtual address and having a CEC logical address assignment, and where the directing involves changing the HDMI message's logical address to the logical address for a device having a CEC connection to an HDMI port but having no virtual address; and sending the HDMI message to the device having no CEC connection to an HDMI port but having a virtual address and having a CEC logical address assignment by sending the HDMI message to the port associated with the device's virtual address. In certain implementations, the first, second, third and fourth devices are of the same type, and where the type comprises one of recorder devices and playback devices.

A tangible non-transitory computer readable electronic storage medium consistent with the present teachings stores instructions which, when executed on one or more programmed processors, carry out a method of operating a High Definition Multimedia Interface (HDMI) port involving assigning first, second and third HDMI consumer electronics command (CEC) logical addresses to first, second and third devices connected to first, second and third HDMI ports respectively, where the first, second and third logical addresses represent a maximum number of logical addresses permitted for standard HDMI CEC operation; receiving a polling message from a fourth device connected to a fourth HDMI port requesting the use of the third HDMI device's logical address; disabling a CEC line for the third HDMI port connected to the third HDMI device to prevent the third device from receiving the polling message; assigning the third HDMI CEC device logical address to the fourth device while the third device is still assigned the third HDMI CEC device logical address so that both the third and fourth player devices share the same HDMI CEC device logical address; assigning virtual addresses to the third and fourth HDMI ports connected to the third device and the fourth device respectively; and directing HDMI messages to and from the third and fourth devices using the virtual addresses.

In certain implementations, the directing is carried out by categorizing a type of message and processing the message in accord with the categorized message type. In certain implementations, when an HDMI message is directly addressed to the fourth device, and where the directing involves determining the virtual address of the fourth HDMI device; and directing the HDMI message to the HDMI port to which the fourth HDMI device is connected. In certain implementations, when an HDMI broadcast message is sent directed to multiple devices, and where the directing involves sending the broadcast message to all devices having a CEC logical address and a CEC connection to an HDMI port; and sending the broadcast message a device having no CEC connection to an HDMI port but having a virtual address and having a CEC logical address assignment.

In certain implementations, sending the broadcast message to all devices having no CEC connection to an HDMI port involves disabling a CEC connection to one of the devices connected to a CEC HDMI port; enabling a CEC connection to the device having no CEC connection to an HDMI port; and re-sending the broadcast message to the device formerly having no CEC connection to the HDMI port. In certain implementations, when an HDMI message is sent from a device having no CEC connection to an HDMI port but having a virtual address and having a CEC logical address assignment, and where the directing involves changing the HDMI message's logical address to a virtual address; and processing the message.

In certain implementations, when an HDMI broadcast message is sent from a device having no CEC connection to an HDMI port but having a virtual address and having a CEC logical address assignment, and where the directing involves changing the HDMI broadcast message's logical address to the logical address for a device having a CEC connection to an HDMI port but having no virtual address; and broadcasting the HDMI broadcast message. In certain implementations, when an HDMI message is sent from an initiator device to a device having no CEC connection to an HDMI port but having a virtual address and having a CEC logical address assignment, and where the directing involves changing the HDMI message's logical address to the logical address for a device having a CEC connection to an HDMI port but having no virtual address; and sending the HDMI message to the device having no CEC connection to an HDMI port but having a virtual address and having a CEC logical address assignment by sending the HDMI message to the port associated with the device's virtual address.

A High Definition Multimedia Interface (HDMI) switching apparatus consistent with the present teachings has a plurality of HDMI ports. A port controller is configured to control the plurality of HDMI ports, where the port controller is configured to: assign first, second and third HDMI consumer electronics command (CEC) logical addresses to first, second and third devices connected to first, second and third HDMI ports respectively, where the first, second and third logical addresses represent a maximum number of logical addresses permitted for standard HDMI CEC operation; receive a polling message from a fourth device connected to a fourth HDMI port requesting the use of the third HDMI device's logical address; disable a CEC line for the third HDMI port connected to the third HDMI device to prevent the third device from receiving the polling message; assign the third HDMI CEC device logical address to the fourth device while the third device is still assigned the third HDMI CEC device logical address so that both the third and fourth player devices share the same HDMI CEC device logical address; assign virtual addresses to the third and fourth HDMI ports connected to the third device and the fourth device respectively; and direct HDMI messages to and from the third and fourth devices using the virtual addresses.

In certain implementations, the port controller and HDMI ports reside in a television device. In certain implementations, the port controller and HDMI ports reside in an HDMI switch. In certain implementations, in being configured to direct, the port controller is configured to categorize a type of message and processing the message in accord with the categorized message type. In certain implementations, in being configured to direct, the port controller is configured such that when an HDMI message is directly addressed to the fourth device, the port controller is configured to: determine the virtual address of the fourth HDMI device; and direct the HDMI message to the HDMI port to which the fourth HDMI device is connected.

In certain implementations, in being configured to direct, the port controller is configured such that when an HDMI broadcast message is sent directed to multiple devices, the port controller is configured to: send the broadcast message to all devices having a CEC logical address and a CEC connection to an HDMI port; and send the broadcast message a device having no CEC connection to an HDMI port but having a virtual address and having a CEC logical address assignment. In certain implementations, in being configured to send the broadcast message to all devices having no CEC connection to an HDMI port, the port controller is configured to: disable a CEC connection to one of the devices connected to a CEC HDMI port; enable a CEC connection to the device having no CEC connection to an HDMI port; and re-send the broadcast message to the device formerly having no CEC connection to the HDMI port. In certain implementations, in being configured to direct, the port controller is configured such that when an HDMI message is sent from a device having no CEC connection to an HDMI port but having a virtual address and having a CEC logical address assignment, the port controller is configured to: change the HDMI message's logical address to a virtual address; and process the message.

In certain implementations, in being configured to direct, the port controller is configured such that when an HDMI broadcast message is sent from a device having no CEC connection to an HDMI port but having a virtual address and having a CEC logical address assignment, the port controller is configured to: change the HDMI broadcast message's logical address to the logical address for a device having a CEC connection to an HDMI port but having no virtual address; and broadcast the HDMI broadcast message. In certain implementations, in being configured to direct, the port controller is configured such that when an HDMI message is sent from an initiator device to a device having no CEC connection to an HDMI port but having a virtual address and having a CEC logical address assignment, the port controller is configured to: change the HDMI message's logical address to the logical address for a device having a CEC connection to an HDMI port but having no virtual address; and send the HDMI message to the device having no CEC connection to an HDMI port but having a virtual address and having a CEC logical address assignment by sending the HDMI message to the port associated with the device's virtual address. In certain implementations, the devices are of the same type and where the devices comprise one of recorder devices and playback devices.

A High Definition Multimedia Interface (HDMI) switching apparatus consistent with the present teachings has a plurality of HDMI ports. A port controller configured to control the plurality of HDMI ports, where the port controller is configured to: assign a maximum number of HDMI consumer electronics command (CEC) logical addresses allowed for standard HDMI CEC operation to a plurality of devices of the same type connected to HDMI ports; receive a polling message from another device connected to a another HDMI port requesting the use of the an HDMI device's assigned logical address; disable a CEC line for one of the HDMI ports connected to one of the HDMI devices having CEC logical addresses to prevent the one of the HDMI devices from receiving the polling message; assign the HDMI CEC device logical address to the another device in addition to the one of the HDMI devices so that both the another device and the one of the HDMI devices share the same HDMI CEC device logical address; assign virtual addresses to the another device and the one of the HDMI device's respective connected HDMI ports; and direct HDMI messages to and from the another device and the one of the HDMI devices using the virtual addresses.

In certain implementations, the devices of the same type comprise one of tuner devices, recorder devices and playback devices.

Those skilled in the art will recognize, upon consideration of the above teachings, that certain of the above exemplary embodiments are based upon use of a programmed processor. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

Certain example embodiments described herein, are or may be implemented using a programmed processor executing programming instructions that are broadly described above in flow chart form that can be stored on any suitable electronic or computer readable non-transitory storage medium (such as, for example, disc storage, Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies), where the term "non-transitory" is intended to exclude propagating signals. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain example embodiments of the invention. Error trapping can be added and/or enhanced and variations can be made in user interface and information presentation without departing from certain example embodiments of the present invention. Such variations are contemplated and considered equivalent.

For purposes of the claims, the language "first", "second", "third" etc. are used only as labels without having actual numerical correlation to addressing.

While certain illustrative embodiments have been described, it is evident that many alternatives, modifications, permutations and variations will become apparent to those skilled in the art in light of the foregoing description.

What is claimed is:

1. A method of operation of High Definition Multimedia Interface (HDMI) ports, comprising:
   at an HDMI port controller:
   assigning first, second and third HDMI consumer electronics command (CEC) logical addresses to first, second and third devices connected to first, second and third HDMI ports respectively, where the first, second and third logical addresses represent a maximum number of logical addresses permitted for standard HDMI CEC operation;
   receiving a polling message from a fourth device connected to a fourth HDMI port requesting the use of the third HDMI device's logical address;
   disabling a CEC line for the third HDMI port connected to the third HDMI device to prevent the third device from receiving the polling message;
   assigning the third HDMI CEC device logical address to the fourth device while the third device is still assigned the third HDMI CEC device logical address so that both the third and fourth devices share the same HDMI CEC device logical address;
   assigning virtual addresses to the third and fourth HDMI ports connected to the third device and the fourth device respectively; and
   directing HDMI messages to and from the third and fourth devices using the virtual addresses.

2. The method according to claim 1, where the directing is carried out by categorizing a type of message and processing the message in accord with the categorized message type.

3. The method according to claim 1, where when an HDMI message is directly addressed to the fourth device, and where the directing comprises:
   determining the virtual address of the fourth HDMI device; and
   directing the HDMI message to the HDMI port to which the fourth HDMI device is connected.

4. The method according to claim 1, where when an HDMI broadcast message is sent directed to multiple devices, and where the directing comprises:
   sending the broadcast message to all devices having a CEC logical address and a CEC connection to an HDMI port; and
   sending the broadcast message a device having no CEC connection to an HDMI port but having a virtual address and having a CEC logical address assignment.

5. The method according to claim 4, where sending the broadcast message to all devices having no CEC connection to an HDMI port comprises:
   disabling a CEC connection to one of the devices connected to a CEC HDMI port;
   enabling a CEC connection to the device having no CEC connection to an HDMI port; and
   re-sending the broadcast message to the device formerly having no CEC connection to the HDMI port.

6. The method according to claim 1, where when an HDMI message is sent from a device having no CEC connection to an HDMI port but having a virtual address and having a CEC logical address assignment, and where the directing comprises:
   changing the HDMI message's logical address to a virtual address; and
   processing the message.

7. The method according to claim 1, where when an HDMI broadcast message is sent from a device having no CEC connection to an HDMI port but having a virtual address and having a CEC logical address assignment, and where the directing comprises:
   changing the HDMI broadcast message's logical address to the logical address for a device having a CEC connection to an HDMI port but having no virtual address; and
   broadcasting the HDMI broadcast message.

8. The method according to claim 1, where when an HDMI message is sent from an initiator device to a device having no CEC connection to an HDMI port but having a virtual address and having a CEC logical address assignment, and where the directing comprises:
   changing the HDMI message's logical address to the logical address for a device having a CEC connection to an HDMI port but having no virtual address; and
   sending the HDMI message to the device having no CEC connection to an HDMI port but having a virtual address and having a CEC logical address assignment by sending the HDMI message to the port associated with the device's virtual address.

9. The method according to claim 1, where the first, second, third and fourth devices are of the same type, and where the type comprises one of recorder devices and playback devices.

10. A tangible non-transitory computer readable electronic storage medium storing instructions which, when executed on one or more programmed processors, carry out a method of operating a High Definition Multimedia Interface (HDMI) port, comprising:
    assigning first, second and third HDMI consumer electronics command (CEC) logical addresses to first, second and third devices connected to first, second and third HDMI ports respectively, where the first, second and third logical addresses represent a maximum number of logical addresses permitted for standard HDMI CEC operation;
    receiving a polling message from a fourth device connected to a fourth HDMI port requesting the use of the third HDMI device's logical address;
    disabling a CEC line for the third HDMI port connected to the third HDMI device to prevent the third device from receiving the polling message;
    assigning the third HDMI CEC device logical address to the fourth device while the third device is still assigned the third HDMI CEC device logical address so that both the third and fourth player devices share the same HDMI CEC device logical address;
    assigning virtual addresses to the third and fourth HDMI ports connected to the third device and the fourth device respectively; and
    directing HDMI messages to and from the third and fourth devices using the virtual addresses.

11. The storage medium according to claim 10, where the directing is carried out by categorizing a type of message and processing the message in accord with the categorized message type.

12. The storage medium according to claim 10, where when an HDMI message is directly addressed to the fourth device, and where the directing comprises:
    determining the virtual address of the fourth HDMI device; and
    directing the HDMI message to the HDMI port to which the fourth HDMI device is connected.

13. The storage medium according to claim 10, where when an HDMI broadcast message is sent directed to multiple devices, and where the directing comprises:
    sending the broadcast message to all devices having a CEC logical address and a CEC connection to an HDMI port; and
    sending the broadcast message a device having no CEC connection to an HDMI port but having a virtual address and having a CEC logical address assignment.

14. The storage medium according to claim 13, where sending the broadcast message to all devices having no CEC connection to an HDMI port comprises:
    disabling a CEC connection to one of the devices connected to a CEC HDMI port;
    enabling a CEC connection to the device having no CEC connection to an HDMI port; and
    re-sending the broadcast message to the device formerly having no CEC connection to the HDMI port.

15. The storage medium according to claim 10, where when an HDMI message is sent from a device having no CEC connection to an HDMI port but having a virtual address and having a CEC logical address assignment, and where the directing comprises:
    changing the HDMI message's logical address to a virtual address; and
    processing the message.

16. The storage medium according to claim 10, where when an HDMI broadcast message is sent from a device having no CEC connection to an HDMI port but having a virtual address and having a CEC logical address assignment, and where the directing comprises:
    changing the HDMI broadcast message's logical address to the logical address for a device having a CEC connection to an HDMI port but having no virtual address; and
    broadcasting the HDMI broadcast message.

17. The storage medium according to claim 10, where when an HDMI message is sent from an initiator device to a device having no CEC connection to an HDMI port but having a virtual address and having a CEC logical address assignment, and where the directing comprises:
    changing the HDMI message's logical address to the logical address for a device having a CEC connection to an HDMI port but having no virtual address; and
    sending the HDMI message to the device having no CEC connection to an HDMI port but having a virtual address and having a CEC logical address assignment by sending the HDMI message to the port associated with the device's virtual address.

18. A High Definition Multimedia Interface (HDMI) switching apparatus, comprising:
    a plurality of HDMI ports;
    a port controller configured to control the plurality of HDMI ports, where the port controller is configured to;
    assign first, second and third HDMI consumer electronics command (CEC) logical addresses to first, second and third devices connected to first, second and third HDMI ports respectively, where the first, second and third logical addresses represent a maximum number of logical addresses permitted for standard HDMI CEC operation;
    receive a polling message from a fourth device connected to a fourth HDMI port requesting the use of the third HDMI device's logical address;
    disable a CEC line for the third HDMI port connected to the third HDMI device to prevent the third device from receiving the polling message;
    assign the third HDMI CEC device logical address to the fourth device while the third device is still assigned the third HDMI CEC device logical address so that both the third and fourth player devices share the same HDMI CEC device logical address;
    assign virtual addresses to the third and fourth HDMI ports connected to the third device and the fourth device respectively; and
    direct HDMI messages to and from the third and fourth devices using the virtual addresses.

19. The apparatus according to claim 18, where the port controller and HDMI ports reside in a television device.

20. The apparatus according to claim 18, where the port controller and HDMI ports reside in an HDMI switch.

21. The apparatus according to claim 18, where in being configured to direct, the port controller is configured to categorize a type of message and processing the message in accord with the categorized message type.

22. The apparatus according to claim 18, where in being configured to direct, the port controller is configured such that when an HDMI message is directly addressed to the fourth device, the port controller is configured to:
    determine the virtual address of the fourth HDMI device; and
    direct the HDMI message to the HDMI port to which the fourth HDMI device is connected.

23. The apparatus according to claim 18, where in being configured to direct, the port controller is configured such that when an HDMI broadcast message is sent directed to multiple devices, the port controller is configured to:
    send the broadcast message to all devices having a CEC logical address and a CEC connection to an HDMI port; and
    send the broadcast message a device having no CEC connection to an HDMI port but having a virtual address and having a CEC logical address assignment.

24. The apparatus according to claim 23, where in being configured to send the broadcast message to all devices having no CEC connection to an HDMI port, the port controller is configured to:
    disable a CEC connection to one of the devices connected to a CEC HDMI port;
    enable a CEC connection to the device having no CEC connection to an HDMI port; and
    re-send the broadcast message to the device formerly having no CEC connection to the HDMI port.

25. The apparatus according to claim 18, where in being configured to direct, the port controller is configured such that when an HDMI message is sent from a device having no CEC connection to an HDMI port but having a virtual address and having a CEC logical address assignment, the port controller is configured to:
    change the HDMI message's logical address to a virtual address; and
    process the message.

26. The apparatus according to claim 18, where in being configured to direct, the port controller is configured such that when an HDMI broadcast message is sent from a device having no CEC connection to an HDMI port but having a virtual address and having a CEC logical address assignment, the port controller is configured to:
    change the HDMI broadcast message's logical address to the logical address for a device having a CEC connection to an HDMI port but having no virtual address; and
    broadcast the HDMI broadcast message.

27. The apparatus according to claim 18, where in being configured to direct, the port controller is configured such that when an HDMI message is sent from an initiator device to a device having no CEC connection to an HDMI port but having a virtual address and having a CEC logical address assignment, the port controller is configured to:
    change the HDMI message's logical address to the logical address for a device having a CEC connection to an HDMI port but having no virtual address; and
    send the HDMI message to the device having no CEC connection to an HDMI port but having a virtual address and having a CEC logical address assignment by sending the HDMI message to the port associated with the device's virtual address.

28. The apparatus according to claim 18, where the devices are of the same type and where the devices comprise one of recorder devices and playback devices.

29. A High Definition Multimedia Interface (HDMI) switching apparatus, comprising:
    a plurality of HDMI ports;
    a port controller configured to control the plurality of HDMI ports, where the port controller is configured to;
    assign a maximum number of HDMI consumer electronics command (CEC) logical addresses allowed for standard HDMI CEC operation to a plurality of devices of the same type connected to HDMI ports;
    receive a polling message from another device connected to a another HDMI port requesting the use of the an HDMI device's assigned logical address;
    disable a CEC line for one of the HDMI ports connected to one of the HDMI devices having CEC logical addresses to prevent the one of the HDMI devices from receiving the polling message;
    assign the HDMI CEC device logical address to the another device in addition to the one of the HDMI devices so that both the another device and the one of the HDMI devices share the same HDMI CEC device logical address;
    assign virtual addresses to the another device and the one of the HDMI device's respective connected HDMI ports; and
    direct HDMI messages to and from the another device and the one of the HDMI devices using the virtual addresses.

30. The apparatus according to claim 29, where the devices of the same type comprise one of tuner devices, recorder devices and playback devices.

* * * * *